United States Patent
Sturm et al.

(10) Patent No.: US 11,726,350 B2
(45) Date of Patent: Aug. 15, 2023

(54) PROGRESSIVE ADDITION LENS AND METHOD FOR MANUFACTURING THEREOF

(71) Applicant: RUPP + HUBRACH OPTIK GMBH, Bamberg (DE)

(72) Inventors: Roman Sturm, Bamberg (DE); Thorsten Stein, Bamberg (DE); Martin Bissinger, Bamberg (DE)

(73) Assignee: RUPP + HUBRACH OPTIK GMBH, Bamberg (DE)

( * ) Notice: Subject to any disclaimer, the term of this patent is extended or adjusted under 35 U.S.C. 154(b) by 291 days.

(21) Appl. No.: 16/644,564

(22) PCT Filed: Sep. 11, 2018

(86) PCT No.: PCT/EP2018/074497
§ 371 (c)(1),
(2) Date: Mar. 5, 2020

(87) PCT Pub. No.: WO2019/048709
PCT Pub. Date: Mar. 14, 2019

(65) Prior Publication Data
US 2021/0356766 A1 Nov. 18, 2021

(30) Foreign Application Priority Data
Sep. 11, 2017 (EP) .................................. 17190470

(51) Int. Cl.
*G02C 7/02* (2006.01)
*G02C 7/06* (2006.01)

(52) U.S. Cl.
CPC ............. *G02C 7/066* (2013.01); *G02C 7/027* (2013.01)

(58) Field of Classification Search
CPC ........ G02C 7/065; G02C 7/066; G02C 7/068; G02C 7/022; G02C 7/024; G02C 7/025;
(Continued)

(56) References Cited

U.S. PATENT DOCUMENTS 5,710,615 A * 1/1998 Kitani .................... G02C 7/061
351/159.42
2006/0176445 A1 8/2006 Shinohara et al.
(Continued)

FOREIGN PATENT DOCUMENTS

EP 1 688 781 A1 8/2006

OTHER PUBLICATIONS

International Search Report dated Nov. 20, 2018 in PCT/EP2018/074497 filed Sep. 11, 2018.

*Primary Examiner* — Mustak Choudhury
(74) *Attorney, Agent, or Firm* — Oblon, McClelland, Maier & Neustadt, L.L.P.

(57) ABSTRACT

A progressive addition lens includes a first fitting point, a near vision reference point and a first optical spherical power variation between the first fitting point and the near vision reference point. The lens further includes a second fitting point and a night vision reference point located on a same face of the lens, the night vision reference point being positioned on an eye gaze direction inclined by an upward eye gaze declination angle when the user wears the progressive addition lens mounted in a frame with a downward head declination angle opposite to the upward eye gaze declination angle without moving the frame relatively to the user's face, the progressive addition lens presenting a second optical spherical power variation between the second fitting point and the night vision reference point, the night vision reference point having a lower optical spherical power than the second fitting point.

15 Claims, 4 Drawing Sheets

(58) Field of Classification Search
CPC ...... G02C 7/027; G02C 7/061; G02C 13/005; G02C 2202/08
USPC .................................................. 351/159.42
See application file for complete search history.

(56) References Cited

U.S. PATENT DOCUMENTS

| | | | |
|---|---|---|---|
| 2010/0134755 A1* | 6/2010 | Kaga | G02C 7/068 |
| | | | 351/159.42 |
| 2012/0147317 A1* | 6/2012 | Loeb, Jr. | G02C 7/06 |
| | | | 351/159.43 |
| 2012/0188504 A1* | 7/2012 | Petignaud | G02C 7/024 |
| | | | 351/159.74 |
| 2016/0011436 A1* | 1/2016 | Contet | G02C 7/027 |
| | | | 351/159.77 |
| 2016/0209677 A1* | 7/2016 | Izawa | G02C 7/024 |
| 2017/0108712 A1* | 4/2017 | Guilloux | G02C 7/027 |
| 2017/0219847 A1* | 8/2017 | Rusch | G02C 7/045 |
| 2017/0299890 A1* | 10/2017 | Hernandez-Castaneda | G02C 7/027 |
| 2018/0081196 A1* | 3/2018 | Benoit | G02C 7/027 |
| 2019/0155056 A1* | 5/2019 | Granger | G02C 7/027 |

\* cited by examiner

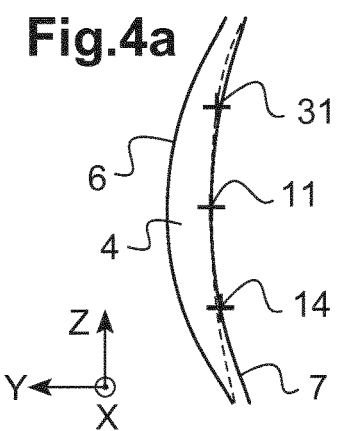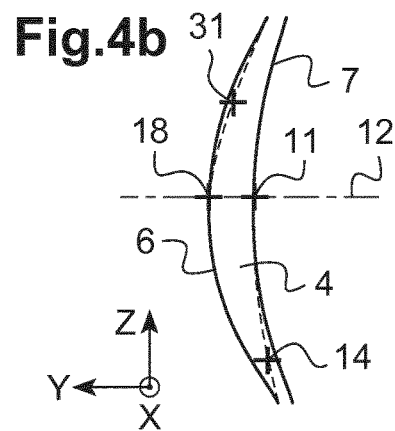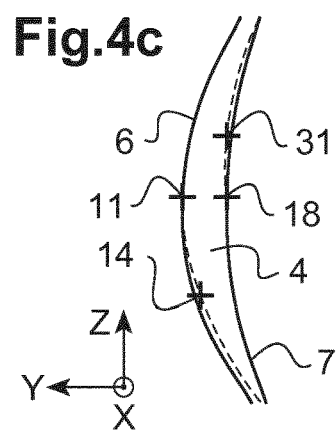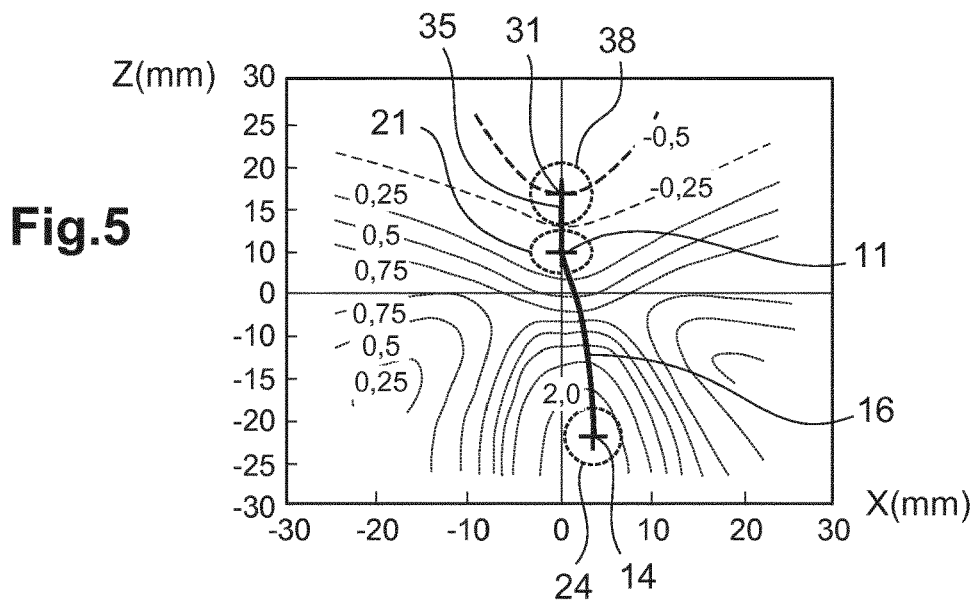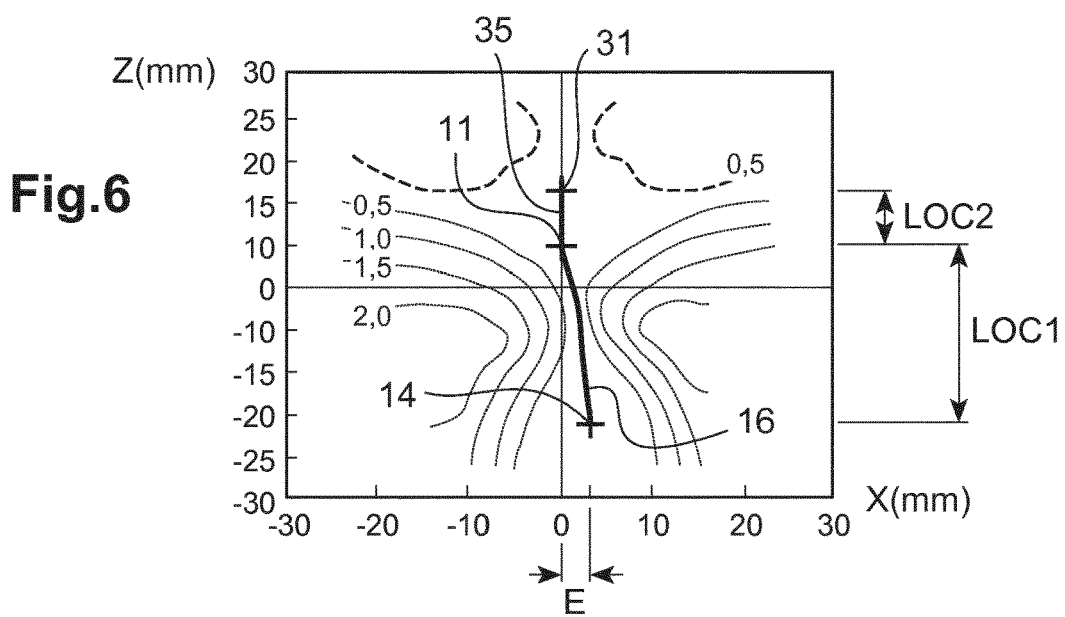

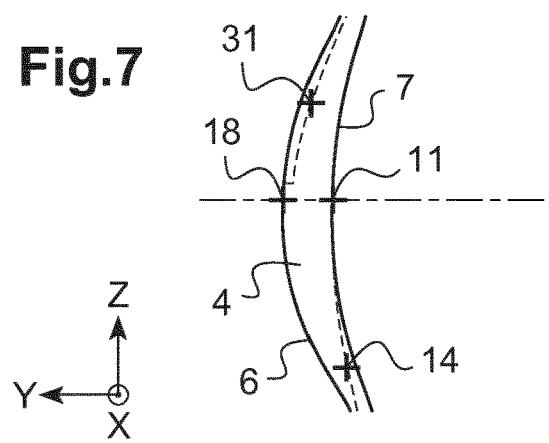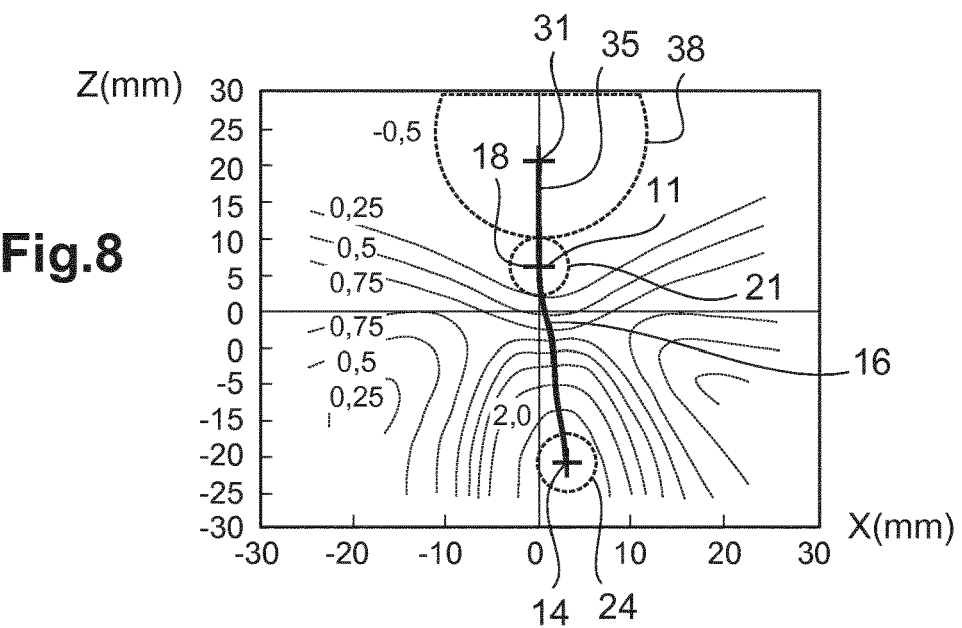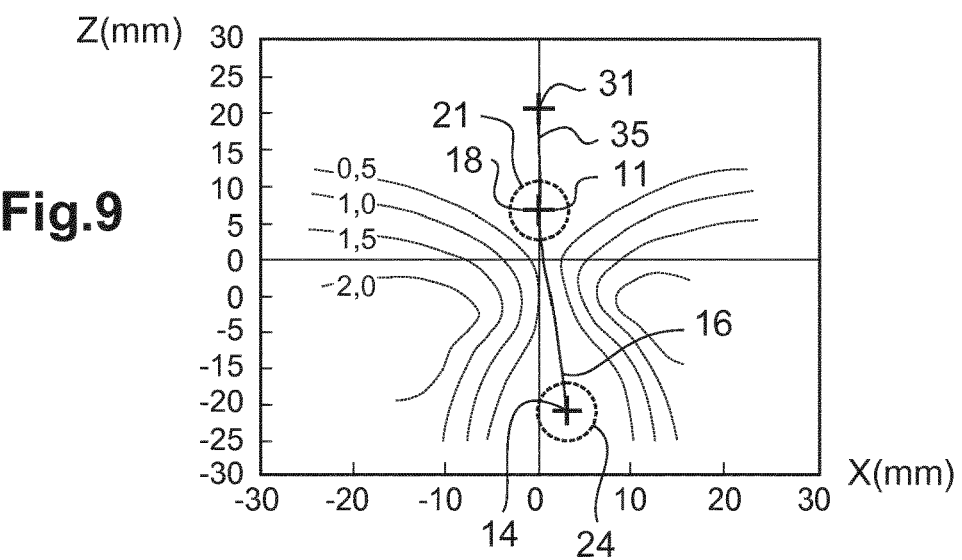

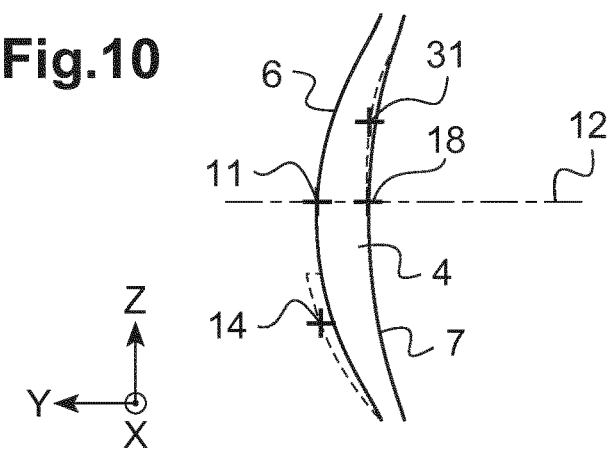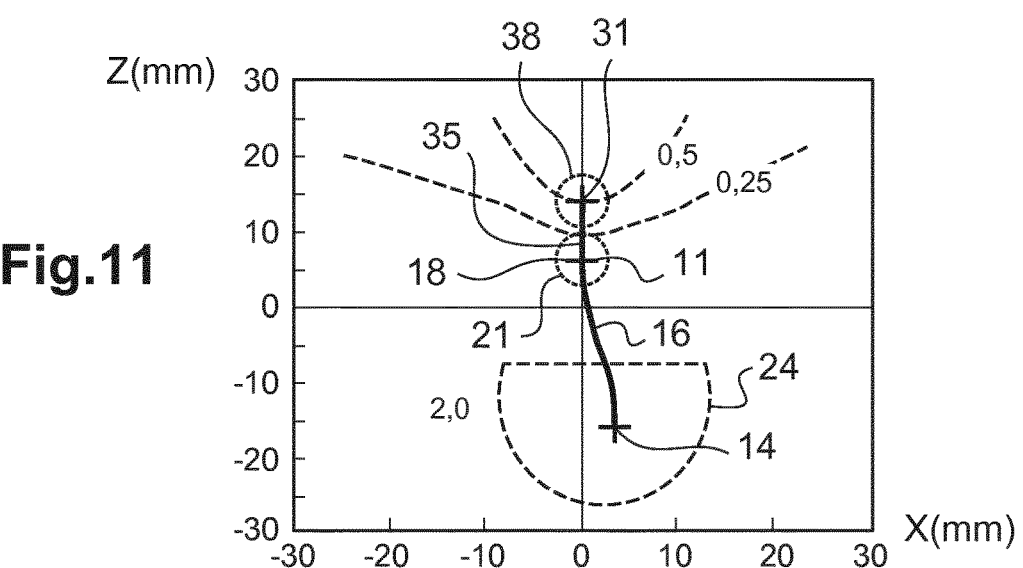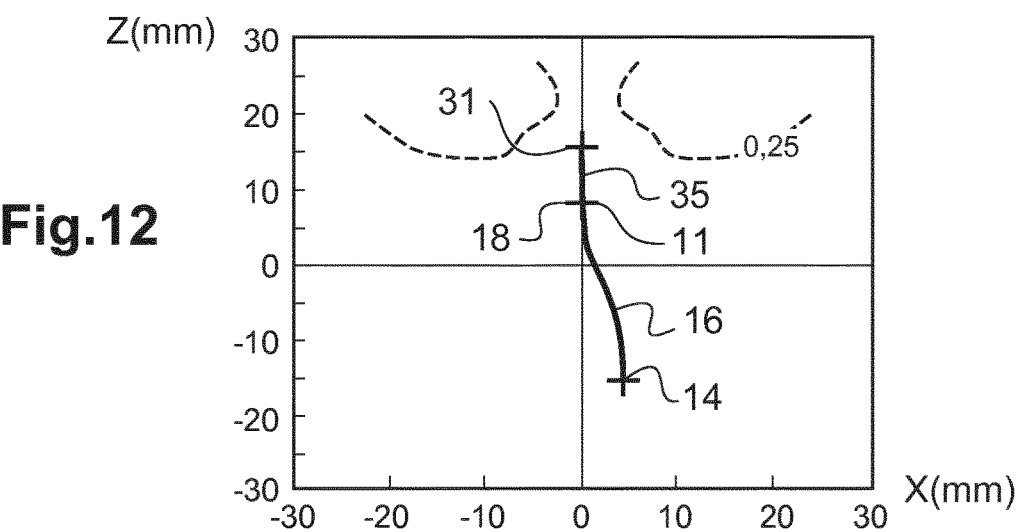

PROGRESSIVE ADDITION LENS AND METHOD FOR MANUFACTURING THEREOF

TECHNICAL FIELD OF THE INVENTION

The invention relates to an ophthalmic lens and to a method for manufacturing an ophthalmic lens.

More precisely, the invention relates to an ophthalmic lens that is adapted for correcting vision both in daytime and in nighttime vision conditions and to a method of manufacturing thereof.

BACKGROUND INFORMATION AND PRIOR ART

Numerous documents describe devices and methods for designing and manufacturing multifocal lenses and progressive addition lenses having a lens power in a near vision area and another lens power in a far vision area.

However, vision during night can be reduced due to night myopia. In such a case, a different lens power is required compared to daylight correction. To obtain a proper correction in daytime and in nighttime, some users have two different spectacles, one spectacle with far vision lens power correcting vision at daylight and another spectacle with lens power optimized for night vision. This solution requires buying two rather expensive spectacles. Moreover, it is necessary to change spectacles according to light conditions. A fast, occasional change of spectacles during night depending on vision situations is generally not possible.

For non presbyopic users, a specific progressive power lens provides far vision powers for day and night use. Using the different power parts of such a lens is achieved by changing vertical head angle and/or gaze direction only. The use of such a lens is fast and intuitive for the spectacle wearer.

However, for presbyopic spectacle wearers it is generally necessary to have two different spectacles, for example two multifocal spectacles, one with lens with far vision power for daylight use, another with lens with far vision power for night vision or two spectacles, one multifocal with lens power with far vision power for daylight use, and another single vision spectacle lens with far vision power for night only without reading option.

Patent document WO 2012/078912 A2 discloses an eyewear solution comprising a frame integrating a mechanism to move the lens relatively to the wearer's eye depending on the vision conditions. However, this system requires a complex and expensive mechanism and a controller to move the lens frame, and the use thereof and may not be intuitive.

SUMMARY OF THE INVENTION

There is a need for a simpler and more intuitive eyewear solution suitable for daytime vision and nighttime vision, both in far vision and near vision and adapted for presbyopic or non presbyopic user.

Therefore one object of the invention is to provide a personalized eyewear solution adapted to the needs of a user for daytime vision and nighttime vision both in far vision and near vision.

The above objects are achieved according to the invention by providing a progressive addition lens comprising a first fitting point and a near vision reference point located on a same face of the lens, the first fitting point being positioned on a straight horizontal eye gaze direction when a user wears the progressive addition lens mounted in a frame with a null user head declination angle, the near vision reference point being positioned on a downward eye gaze direction when the user wears the progressive addition lens mounted in the frame, the progressive addition lens comprising a first optical spherical power variation between the first fitting point and the near vision reference point.

According to the invention, the progressive addition lens further comprises a second fitting point and a night vision reference point located on a same face of the lens, the second fitting point being positioned on a straight horizontal eye gaze direction when the user wears the progressive addition lens mounted in the frame with a null user head declination angle, the night vision reference point being positioned on an eye gaze direction inclined by an upward eye gaze declination angle when the user wears the progressive addition lens mounted in the frame with a downward head declination angle opposite to the upward eye gaze declination angle without moving the frame relatively to the user's face, the progressive addition lens comprising a second optical spherical power variation between the second fitting point and the night vision reference point, said night vision reference point having a lower optical spherical power than the second fitting point.

This configuration enables to integrate a separate variable night myopia correction on a progressive addition lens comprising a progressive first optical spherical power variation from far vision power to near vision power in day time. Using the different power parts of such a lens is achieved intuitively by changing vertical head angle and/or eye declination angle only.

According to a preferred embodiment, spherical power at the night vision reference point is lower than spherical power at the second fitting point by a value comprised between −0.25 diopter and −1.00 diopter.

According to a specific and advantageous aspect, the night vision reference point is positioned on an eye gaze direction corresponding to an upward eye gaze declination angle comprised between 10 degrees and 25 degrees.

Advantageously, the night vision reference point is at a distance of 12 mm±7 mm from the second fitting point and the night vision reference point presents a null inset relatively to the second fitting point.

In an embodiment, the first optical spherical power variation and the second optical spherical power variation are both formed on a concave face of the progressive addition lens. In this embodiment, the first fitting point and the second fitting point are merged.

In another embodiment, the first optical spherical power variation and the second optical spherical power variation are both formed on a convex face of the progressive addition lens. In this embodiment, the first fitting point and the second fitting point are merged.

In alternative embodiments, the first optical spherical power variation between the first fitting point to the near vision reference point is formed on a face of the progressive addition lens and the second optical spherical power variation is formed on another face of the progressive addition lens. In these alternative embodiments, the first fitting point and the second fitting point are different, but located on the same gaze direction.

According to another particular and advantageous aspect, the progressive addition lens comprises a night vision area extending around the night vision reference point, preferably over a surface greater than a disk of at least a few millimeters in diameter, the night vision area being enclosed in a cone having its apex located at the eye rotation center of the user eye located behind the progressive lens. Preferably, the night vision area has a uniform optical spherical power.

According to another particular and advantageous aspect, the progressive addition lens comprises a daytime far vision area extending around the first fitting point, preferably over a surface greater than a disk of at least a few millimeters in diameter, the daytime far vision area having a uniform spherical power and the night vision area and the daytime far vision area are connected by a corridor having a length and/or width adjusted as a function of the user.

Preferably, unwanted astigmatism is less than 0.75 diopter (dpt) in the night vision area.

According to another particular aspect of the invention, at least one of the first optical spherical power variation and the second optical spherical power variation is continuous and:
the first optical spherical power variation presents a continuous optical spherical power variation from the first fitting point to the near vision reference point;
the first optical spherical power variation presents discontinuous optical spherical power variation between the first fitting point and the near vision reference point;
the second optical spherical power variation presents a continuous optical spherical power variation from the second fitting point to the night vision reference point; or
the second optical spherical power variation presents discontinuous optical spherical power variation between the second fitting point and the night vision reference point.

Advantageously, the lens further comprises a cylindrical power for astigmatism correction.

A further object of the invention is to provide a method for manufacturing a progressive addition lens comprising the following steps:
determining a first fitting point and a near vision reference point located on a same face of a lens, the first fitting point being intended to be positioned on a straight horizontal eye gaze direction when a user wears the progressive addition lens mounted in a frame with a null user head declination angle, the near vision reference point being intended to be positioned on a downward inclined eye gaze direction when the user wears the progressive addition lens mounted in the frame, determining a daytime far vision spherical power for the first fitting point, and determining a first optical spherical power variation between the first fitting point and the near vision reference point,
determining a downward head declination angle opposite to an upward eye gaze declination angle for far vision in nighttime,
determining a second fitting point and a night vision reference point located on a same face of the lens, the second fitting point being intended to be positioned on a straight horizontal eye gaze direction when the user wears the progressive addition lens mounted in the frame with a null user head declination angle and the night vision reference point being intended to be positioned on an eye gaze direction inclined by the upward eye gaze declination angle when the user wears the progressive addition lens mounted in the frame with the downward head declination angle opposite to the upward eye gaze declination angle without moving the frame relatively to the user's face,
determining a second optical spherical power variation between the second fitting point and the night vision reference point, said night vision reference point having a lower optical spherical power than the second fitting point.

In an embodiment, the method further comprises the following steps:
providing an initial lens;
machining the lens in order to form a far vision power at the first fitting point and the first optical spherical power variation between the first fitting point and the near vision reference point,
machining the lens in order to form the second optical spherical power variation between the second fitting point and the night vision reference point.

According to a particular aspect of this method, spherical power at the night vision reference point is lower than spherical power at the second fitting point by a value comprised between −0.25 diopter and −1 diopter.

According to a particular aspect, the first optical spherical power variation and the second optical spherical power variation are both formed on a concave face of the lens.

According to another particular aspect, the first optical spherical power variation and the second optical spherical power variation are both formed on a convex face of the lens.

Alternatively, the method comprises a step of forming the first optical spherical power variation between the first fitting point and the near vision reference point on a face of the progressive addition lens and another step of forming the second optical spherical power variation between the second fitting point and the night vision reference point on another face of the progressive addition lens.

Preferably, the method comprises positioning the night vision reference point at a distance of 12 mm±7 mm from the second fitting point, the night vision reference point presenting a null inset relatively to the second fitting point.

BRIEF DESCRIPTION OF THE DRAWING(S)

This description is given for non limiting illustrative purposes only and will be better understood when referring to the annexed drawings wherein.

Figure 3:
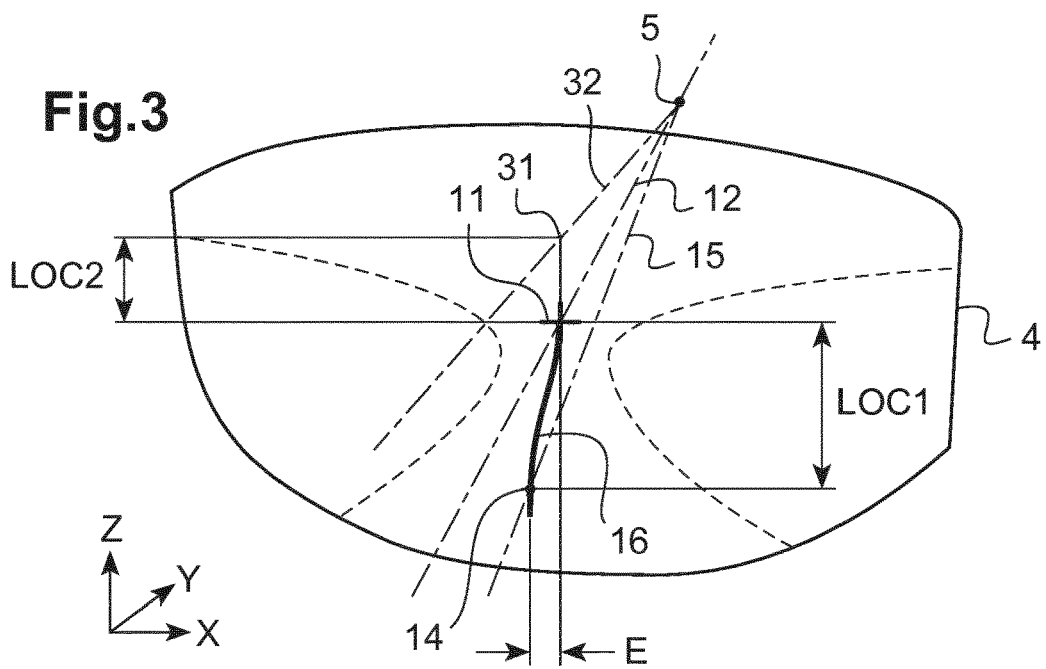

FIG. 3 schematically shows a progressive addition lens according to the present disclosure having first optical spherical power variation between a first fitting point and a near vision point for daytime vision and comprising an additional night vision zone in the upper part of the lens presenting a second optical spherical power variation between a second fitting point and a night vision reference point night vision;

FIG. 4A schematically shows a cut view of a progressive addition lens according to a first embodiment of the invention wherein the first optical spherical power variation for daytime vision and the second optical spherical power variation for nighttime vision are both formed continuously on the inner face of the lens;

FIG. 4B schematically shows a cut view of a progressive addition lens according to a second embodiment of the invention wherein the first optical spherical power variation for daytime vision is formed on the concave face of the lens and the second optical spherical power variation for nighttime vision is formed on the convex face of the lens; FIG.

4C schematically shows a cut view of a progressive addition lens according to a variant of the second embodiment wherein the first optical spherical power variation for daytime vision is formed on the convex face of the lens and the second optical spherical power variation for nighttime vision is formed on the concave face of the lens;

FIG. 5 schematically shows an example of spherical power distribution for a progressive addition lens as illustrated on FIG. 4A-4C comprising a day light far vision area, a near vision area and an additional night vision zone;

FIG. 6 schematically shows a distribution of unwanted astigmatism for the progressive addition lens having a spherical power distribution as represented on FIG. 5;

FIG. 7 schematically shows a cut view of a progressive addition lens according to a third embodiment wherein the first optical spherical power variation for daytime vision is continuous and the second optical spherical power variation for nighttime vision presents a discontinuity;

FIG. 8 schematically shows an example of spherical power distribution for progressive addition lens as illustrated on FIG. 7;

FIG. 9 schematically shows distribution of unwanted astigmatism for the progressive addition lens having a spherical power distribution as represented on FIG. 8;

FIG. 10 schematically shows a cut view of a progressive addition lens according to a fourth embodiment wherein the first optical spherical power variation for daytime vision presents a discontinuity and the second optical spherical power variation for nighttime vision is continuous;

FIG. 11 schematically shows an example of spherical power distribution for progressive addition lens as illustrated on FIG. 10;

FIG. 12 schematically shows distribution of unwanted astigmatism for the for progressive addition lens having a spherical power distribution as represented on FIG. 11.

DETAILED DESCRIPTION OF EXAMPLE(S)

Figure 1:
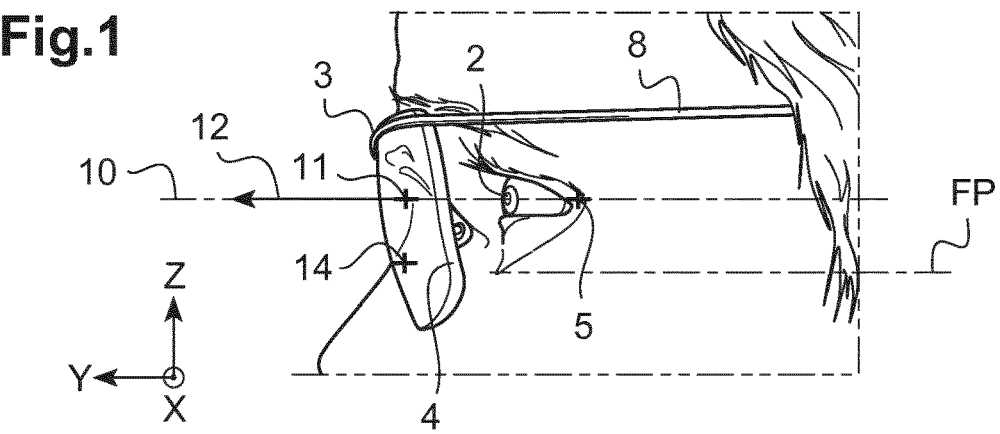
FIG. 1 represents schematically a side view of a user wearing a progressive addition lens in a frame in a far vision and day light configuration.

FIG. 1 represents a side view of a user's head wearing spectacles. The spectacles comprises a frame 3 attached to a lens 4 and a temple 8. Another lens and another temple are attached symmetrically to the right side of the spectacles.

We first define some technical terms used in the course of the following description.

In anatomy, the Frankfurt plane FP is defined as the plane passing through the inferior orbital margins and the porion of the subject, the porion being the highest point in the skull of the ear canal, which corresponds to the tragion of the ear, i.e. the highest point of the tragus of the ear. The sagittal plane of the head of the user is the plane orthogonal the Frankfurt plane passing through the middle of the two centers of rotation of the eyes.

In FIG. 1, the user is supposed to be in an orthostatic position, in which position he makes a minimum of effort. In FIG. 1, the user is considered to be seated or standing such that his head is straight, i.e. such that the Frankfurt plane of the head of the subject is substantially horizontal. In this orthostatic posture, the sagittal plane is generally vertical. The plane of FIG. 1 is parallel to the sagittal plane of the head of the subject and perpendicular to the Frankfurt plane of the user's head.

An eye gaze direction of the user is defined as a line passing through the object focused on by the user and the center of the exit pupil of said eye (i.e. the image of the real pupil produced by the cornea). The eye gaze direction also passes through the optical center of rotation of said eye.

In FIG. 1, when the user is looking at infinity on the horizon straight in front of him, the eye gaze direction 12 or straight eye gaze direction is in a plane parallel to the sagittal plane of the user and substantially merged with a horizontal line 10. In contrast, when looking at a near distance object, the eye gaze direction forms an angle with the sagittal plane of the user due to eye gaze convergence.

In the present document, the position of the spectacle lens, including frame 3, lens 4 and temple 8 is supposed to remain fixed relatively to the user's face. Only the eye gaze direction and/or the head direction may change. We consider in particular a rotation of an eye 2 about its optical center of rotation in order to change of the eye gaze direction. FIG. 1 shows in projection the position of the optical center of rotation 5 of the eye 2.

In a plane parallel to the sagittal plane, the eye gaze declination angle relatively to the straight eye gaze direction 12 is herein noted ALPHA. In other words, the angle ALPHA herein corresponds to the angle of inclination of the eye gaze direction relatively to the Frankfurt plane FP.

We also consider a rotation of the head of the user about a horizontal axis perpendicular to the sagittal plane of the head of the user. The head declination angle in the sagittal plane is herein noted BETA. The inclination of the body of the wearer is supposed to remain constant in the present document. In other words, the angle BETA herein corresponds to the angle of inclination of the Frankfurt plane FP relatively to a horizontal plane.

Within the present disclosure, a progressive addition lens is an ophthalmic lens presenting a progressive optical spherical power variation as a function of the spatial position (X, Z) in a projection plane parallel to the mounting plane of said lens. Depending on the user's prescription, the progressive addition lens may additionally comprise a correction of astigmatism defined by a cylinder value and an axis value. However, the cylinder value and axis value are generally uniform across the surface of the progressive addition lens. The progressive addition lens may present residual or unwanted astigmatism spatial variations due to the design and manufacture of the progressive optical spherical power variation. The lens design is generally optimized so that unwanted astigmatism is kept as low as possible in the areas of the lens that are mostly used.

Device

In FIG. 1, a user wears a progressive addition lens 4 in far vision and day light conditions. The lens 4 is supported by a frame 3. The frame 3 rests on the user's ears via temples 8 and on his nose via a nose pad. The user is seated or standing so that his head is straight. In other words, the Frankfurt plane of the user is parallel to a horizontal plane. FIG. 1 shows the trace of the Frankfurt plane FP the plane of FIG. 1 which is orthogonal to the Frankfurt's plane.

FIG. 1 shows an orthonormal coordinate system (X, Y, Z). The X and Y axis are in the horizontal plane and Z is a vertical axis. Axis Y is a horizontal line parallel to the sagittal plane of the head of the user.

The user looks at an object placed at infinity on the horizon straight in front of him in day light conditions. These conditions correspond to far vision conditions in day light. In far vision and day light, the first eye gaze direction 12 is parallel to a horizontal line 10 and the user's head presents a declination angle BETA which is null (BETA~0 deg). The eye gaze declination angle ALPHA in far vision in day light is also null (ALPHA~0 deg).

In these conditions, the progressive addition lens 4 is designed and manufactured so that the first fitting point 11 corresponding to the conventional far vision optical spherical power correction in day light conditions is located on the lens 4, at the intersection with the first eye gaze direction 12. The first fitting point 11 corresponds to the fitting point defined in ISO standard 13666.

The progressive addition lens also provides a near vision reference point located in the lower part of the lens 4 and presenting a near vision power addition relatively to the optical spherical power at the first fitting point. FIG. 1 shows the near vision reference point 14. The near vision reference point 14 corresponds to the near design reference point defined in ISO standard 13666. The user reaches the near vision reference point by looking at an object or an image placed at a distance of about 40 cm in day light conditions and by lowering his eye gaze direction relatively to his Frankfurt plane. The near vision reference point 14 is designed and manufactured so as to correspond to the conventional near vision optical spherical power correction in day light conditions. The near vision reference point 14 corresponds to an eye gaze direction inclined by an angle ALPHA comprised between 20 and 45 degrees.

Figure 2:
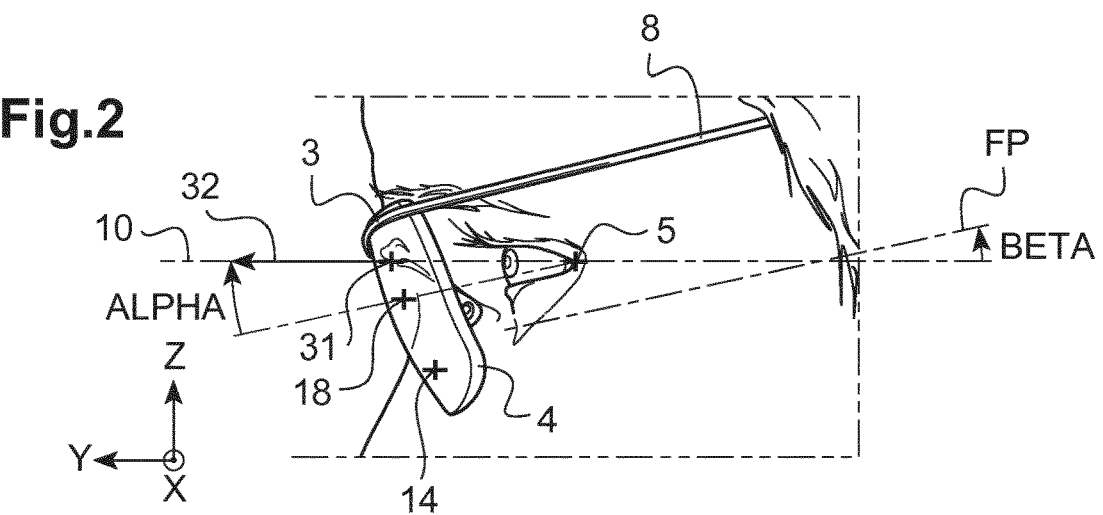
FIG. 2 represents schematically a side view of a user wearing a progressive addition lens according to the present disclosure in a far vision and night light configuration.

FIG. 2 shows the same user wearing the same progressive addition lens here in night light conditions. The user has tilted his head with a downward declination angle BETA of about +15 degrees in this example. In other words, the Frankfurt plane of the head of the user is inclined forward by the angle BETA~15 deg. Simultaneously, the user raises his eye gaze direction 32 by an eye gaze declination angle ALPHA of about −15 degrees. In other words, the eye gaze direction 32 is inclined upwards by the angle ALPHA about the eye rotation center 5. The angle ALPHA being opposite to the angle BETA, the eye gaze direction 32 remains parallel to the horizontal line 10 in this configuration. As a result, in this configuration, the user still looks at an object at infinity on the horizontal line 10. However, the eye gaze direction 32 does not intersect the lens at the second fitting point 18 placed at the intersection with the straight eye gaze direction but at a point 31 which is located in the upper part of the lens 4. According to the present disclosure, the night vision reference point 31 is designed and manufactured so as to present a lower optical spherical power than the second fitting point.

Thus, the night vision reference point 31 enables to correct night myopia and provide an optimal correction for far vision in night time. Generally, an individually required power-difference between far vision power in daylight and far vision power in night vision can be chosen out of: −0,25 dpt, −0,50 dpt, −0,75 dpt and −1.00 dpt. Of course, individualized values of power difference to correct night myopia can be determined and manufactured with a higher accuracy, for example of ±0.1 diopter or even ±0.05 diopter.

The angles ALPHA and BETA are preferably comprised, in absolute value, between 10 degrees and 25 degrees. Depending on the spectacles frame and on the range available in the upper part of the lens, the angle BETA may be determined for each user individually so as to provide comfortable vision conditions in night light conditions. In particular, the frame must provide enough space in the upper part of the lens above the first fitting point 11.

Depending on the angle ALPHA and on the distance between the eye rotation center 5 and the mounting plane of the lens, the distance between the second fitting point 18 and the night vision reference point 31 is generally comprised between 12 mm±7 mm. On FIG. 2, the second fitting point 18 and the night vision reference point 31 are in a same vertical plane.

The user only needs to lower his head and direct his eye gaze direction straight in front of him along a horizontal line to change the optical correction in far vision from day light vision to night vision and vice versa. For example, the user may lock his eye gaze direction toward an object at infinity on a horizontal line and lower his head until he reaches an optimum vision correction in night light condition. The user does not need to move his spectacles relatively to his face and does not need to change spectacles. Moreover, in day light condition, the night reference point being located in the upper part of the lens 4 does not affect adversely the conventional viewing conditions using this progressive addition lens, whether in far vision or in near vision.

FIG. 3 schematically shows in perspective a progressive addition lens 4 according to the present disclosure together with eye gaze direction 15 in near vision, and, respectively, eye gaze direction 12 in far vision point in daytime conditions and eye gaze direction 32 in far vision point in nighttime conditions. The eye gaze directions 12, 15, 32 all pass through the eye rotation center 5. FIG. 3 shows the contour of the lens 4 in projection in an XZ plane or mounting plane of the lens 4. The progressive addition lens 4 comprises a first fitting point 11 situated at the intersection of one face of the lens 4 with a dashed-dotted line 12 representing the eye gaze direction in far vision when the user has a null user head declination angle (BETA~0 deg) and a null eye gaze declination angle (ALPHA~0 deg). The progressive addition lens 4 also comprises a near vision point 14 situated on the same face of the lens as the first fitting point 11 at the intersection a dashed-dotted line 15 representing an eye gaze direction in near vision when the user has a downward tilted eye gaze declination angle (ALPHA>0 deg., for example ALPHA comprised between 20 and 45 deg) and generally a null user head declination angle (BETA~0 deg). The optical spherical power of the lens 4 at the first fitting point 11 is determined as a function of the user's prescription to provide optical spherical power correction in far vision in day light conditions. Further, the optical spherical power of the lens 4 at the near vision point 14 is determined as a function of the user's prescription to provide optical spherical power correction in near vision in day light conditions. Generally, the optical spherical power of the lens 4 at the near vision point 14 corresponds to an additional spherical power, or near vision power addition, relatively to the optical spherical power of the lens 4 at the first fitting point 11.

A progressive addition lens generally presents a progressive first optical spherical power variation between the first fitting point 11 and the near vision point 14 along a meridian curve 16. The first progression length, noted LOC1 for length of first corridor, is defined as the vertical distance between the first fitting point 11 and the position of the near vision point 14. Moreover, the internal offset (or inset E) of the lens 4 is defined as the horizontal offset between the first fitting point 11 and the near vision point 14, both taken in day light conditions. The first progression zone, and respectively inset, correspond to the conventional progression zone, and respectively inset, defined in ISO norm 13666.

According to the present disclosure, the lens 4 further comprises a second fitting point and a night vision reference point 31. As explained in relation with FIG. 2, the night vision reference point 31 is situated at the intersection of one face of the lens 4 with a dashed-dotted line 32 representing an eye gaze direction in far vision when the user has a forward head declination angle BETA>0 and an upward eye gaze declination angle ALPHA<0, the angle ALPHA being equal in absolute value to the angle BETA and of opposite sign than the angle BETA. The second fitting point 18 is situated on the same face of the lens 4 as the night vision reference point 31. The second fitting point 18 is also situated at the intersection with the dashed-dotted line 12 representing the eye gaze direction in far vision when the user has a null user head declination angle (BETA~0 deg) and a null eye gaze declination angle (ALPHA~0 deg). When the second fitting point 18 is situated on the same lens face as the first fitting point 11, the second fitting point 18 is merged with the first fitting point 11. A second progression length, noted LOC2, is defined as the vertical distance between the second fitting point 18 and the night vision reference point 31. The night vision reference point 31 presents a null horizontal offset or null inset relatively to the second fitting point 18.

The optical spherical power of the lens 4 at night vision reference point 31 is determined so as to compensate for night myopia of the user in far vision position in night light conditions. Thus, the lens 4 presents a second optical spherical power variation along a vertical line from the second fitting point 18 to the night vision reference point 31. The spherical power decreases from the second fitting point 18 to the night vision reference point 31 by a value comprised between −0.25 diopter and −1.00 diopter. The progressive addition lens thus presents a nighttime spherical power variation of −0.25 diopter to −1.00 diopter at the night vision reference point 31 relatively to the optical spherical power at the second fitting point 18.

The value of the eye gaze declination angle, ALPHA, of the opposite head declination angle, BETA=−ALPHA for far vision in nighttime, and of the second optical spherical power variation for nighttime vision can be determined or measured individually for a user with a specific frame. The nighttime second optical spherical power variation corresponds to the night myopia observed in night light conditions. Alternatively, the optimum values of ALPHA and nighttime second spherical power variation can be selected among preset values. Depending on the prescription for a specific user and on the frame dimensions, the integration of a night vision reference point may require to shorten the first progression length LOC1. A decreased vision area in day time requires to be accepted by the user. The size of the lens being limited, a compromise is to be found between the first progression length, LOC1, and the second progression length, noted LOC2.

The dashed lines on the lens 4 in FIG. 3 represent iso-astigmatism lines for unwanted astigmatism. The integration of the night vision reference point 31 and of the second optical spherical power variation makes the design of the progressive addition lens 4 much more difficult in particular regarding unwanted astigmatism because it includes additional constraint parameters to the design of the lens.

For most of the presbyopic users, the first optical power variation (also called near vision power addition) is generally comprised between +1,75 and +2.75 diopters. Thus, the second optical spherical power variation for night use is generally of reduced amplitude compared to the near vision power addition. In the case of presbyopic users, the optical spherical power variation may thus be continuous from the night vision reference point 31 to the near vision reference point 14.

FIG. 4A-4C schematically show a projection of the profile of a lens in a vertical plane (YZ). The lens 4 has a convex face 6 (or outer face) and a concave face 7 (or inner face). The plain lines represent the freeform or blank surface profile before shaping the lens and, respectively, the dashed lines represent the lens surface after manufacturing to provide the progressive correction in near vision and far vision for day light and night light conditions.

FIG. 4A illustrates a first embodiment of the lens 4 wherein the first optical spherical power variation for daytime vision and the second optical spherical power variation for nighttime vision are both formed on the concave face 7 of the lens. In this embodiment, the first fitting point 11 is merged with the second fitting point. Moreover, the first optical spherical power variation presents continuous variations along the meridian curve from the first fitting point 11 to the near vision reference point 14. Also, the second optical spherical power variation presents continuous variations along the line joining the second fitting point 18 to the night vision reference point 31. Preferably, the progressive line joining the second fitting point 18 to the night vision reference point 31 is tangent to the meridian curve at the first fitting point 11. Advantageously, in this configuration, the optical spherical power variation presents continuous variations from the near vision reference point 14 to the night vision reference point 31 passing through the first fitting point 11. This configuration enables to integrate during the same manufacturing process the formation of the day time progressive addition lens and the additional night vision reference point 31.

FIG. 4B illustrates a second embodiment of the lens 4 wherein the first optical spherical power variation for daytime vision is formed on the concave face 7 of the lens and the second optical spherical power variation for nighttime vision is formed on the convex face 6 of the lens. In FIG. 4B, the first optical spherical power variation also presents continuous variations along the meridian curve from the first fitting point 11 to the near vision reference point 14 on the convex face 7 of the lens 4. In this embodiment, the second fitting point 18 is on the convex face 6 of the lens at the intersection with the straight eye gaze direction 12. The night vision reference point 31 is also on the convex face 6 of the lens. Here, the second optical spherical power variation presents a continuous variation between the second fitting point 18 and the night vision reference point 31.

FIG. 4C illustrates a variant of the second embodiment of the lens 4 wherein the first optical spherical power variation for daytime vision is formed on the convex face 6 of the lens and the second optical spherical power variation for nighttime vision is formed on the concave face 7 of the lens. The first fitting point 11 and the near vision point 14 are thus on the convex face 6 of the lens. The second fitting point 18 and the night vision reference point 31 are on the concave face 7 of the lens. In FIG. 4C, the first optical spherical power variation also presents continuous variations along the meridian curve from the first fitting point 11 to the near vision reference point 14. Also, the second optical spherical power variation presents a continuous variation between the second fitting point 18 and the night vision reference point 31.

This second embodiment requires an additional processing step to shape the other face of the lens than the lens face bearing the first spherical power variation. This configuration enables to adapt a preexisting progressive addition lens to incorporate an additional night vision reference point 31 without modifying the design of the first fitting point 11 and the first optical spherical power variation.

FIG. 5 schematically shows an example of spherical power distribution in projection in an (XZ) plane for a progressive addition lens represented on FIG. 4A-4C. In this projection, the first fitting point 11 is superimposed with the second fitting point. The geometric center of the lens or prism reference point corresponds to the position (X, Z)=(0, 0). The dotted lines represent iso-spherical power addition lines for the first optical spherical power variations corresponding to the day light far vision area and near vision area. The dashed lines represent iso-spherical power addition lines for the second optical spherical power variations. In this example the first fitting point 11 for far vision in day light presents a zero spherical power and the near vision reference point 14 presents a +2 diopter power addition. The first optical spherical power variation from the first fitting point 11 to the near vision reference point 14 is continuous. The night vision reference point 31 presents a −0.5 diopter optical spherical power addition for far vision in night light conditions. The second optical spherical power variation from the second fitting point to the night vision reference point 31 is also continuous. The night vision reference point 31 is situated at a vertical distance of about 10 mm from the second fitting point. During manufacturing of the lens 4 according to the first embodiment, illustrated on FIG. 4A, the spherical power distribution shown in FIG. 5 is applied to the concave face 7 of the lens. In contrast, during manufacturing of the lens 4 according to the second embodiment, illustrated on FIG. 4B, the spherical power distribution corresponding to the dotted lines is applied to the concave face 7 of the lens 4 and the spherical power distribution corresponding to the dashed lines is applied to the upper part of the convex face 6 of the lens 4. During manufacturing of the lens 4 according to the variant of the second embodiment, illustrated on FIG. 4C, the spherical power distribution corresponding to the dotted lines is applied to the convex face 6 of the lens 4 and the spherical power distribution corresponding to the dashed lines is applied to the upper part of the concave face 7 of the lens 4.

FIG. 5 further shows an example of meridian curve 16 joining the first fitting point 11 to the near vision reference point 14. In this example, the meridian curve presents continuous power variations as seen from the iso-astigmatism lines. FIG. 5 also shows the progressive line 35 joining the second fitting point 18 to the night vision reference point 31. In this example, the progressive line 35 also presents continuous power variations as seen from the iso-astigmatism.

As illustrated on FIG. 5, the lens 4 preferably comprises a daytime far vision area 21 extending around the first fitting point 11. The daytime far vision area 21 has a uniform spherical power. In this example, the daytime far vision area 21 presents a null spherical power. Here, a uniform spherical power means that astigmatism is low in the daytime far vision area, corresponding to an almost constant spherical power, as known in ophthalmic design domain. The daytime far vision area 21 has a disk-shape or an elliptic shape. For example, the daytime far vision area 21 has an elliptic shape with a small axis along Z axis and a long axis along X axis, the daytime far vision area 21 having dimensions of about 5 mm by 8 mm. Also, the lens 4 preferably comprises a daytime near vision area 24 extending around the near vision reference point 14. The daytime near vision area 24 has a uniform spherical power. In this example, the daytime near vision area 24 presents a spherical power of +2.0 diopter. The daytime near vision area 24 has a disk-shape or an elliptic shape. For example, the daytime near vision area 24 has a disk-shape, of 5 mm to 10 mm in diameter. Furthermore, the lens 4 preferably comprises a nighttime far vision area 38 extending around the night vision reference point 31. The nighttime far vision area 38 has a uniform spherical power. In this example, the nighttime far vision area 38 presents a spherical power of −0.5 diopter. Here, a uniform spherical power means that astigmatism is low in the nighttime far vision area, corresponding to an almost constant spherical power, as known in ophthalmic design domain. The nighttime far vision area 38 has a disk-shape or an elliptic shape. For example, the nighttime far vision area 38 has a disk-shape, of 5 mm to 10 mm in diameter.

FIG. 6 schematically shows an example of distribution of unwanted astigmatism in projection in the (XZ) plane for a progressive addition lens having a spherical power distribution as illustrated on FIG. 5. In FIG. 6, the dotted lines represent iso-astigmatism residual power lines for the first optical spherical power variations corresponding to the day light far vision area and near vision area. These dotted lines determine the sizes of the daytime far vision area 21, of the daytime near vision area 24 and/or of the width of the first corridor between the first fitting point 11 and the near vision reference point 14. In FIG. 6, the dashed lines represent iso-residual astigmatism power lines for the second optical spherical power variations. These dotted lines determine the sizes of the nighttime far vision area 38 and/or of the width of the second corridor between the second fitting point 18 and the far vision reference point 31.

FIG. 7 illustrates a third embodiment of the lens 4 wherein the first optical spherical power variation for daytime vision is formed on the concave face 7 of the lens and the second optical spherical power variation for nighttime vision is formed on the convex face 6 of the lens. Similarly as in FIG. 4B, the first optical spherical power variation presents continuous variations along the meridian curve from the first fitting point 11 to the near vision reference point 14 on the concave face 7 of the lens 4. However, in contrast with the second embodiment shown on FIG. 4B, in this third embodiment, the second optical spherical power variation presents a discontinuous variation on the convex face 6 between the second fitting point 18 and the night vision reference point 31.

FIG. 8 shows an example of spherical power variations for a lens according to the third embodiment illustrated on FIG. 7. In this example, the lens 4 presents a 0.00 spherical power at the first fitting point and a +2.0 spherical power addition at the near vision reference point 14 in daytime vision. The dotted lines show the continuous spherical power variations between the first fitting point 11 and the daytime near vision area 24 around the near vision reference point 14. The dashed line 38 represents the contours of the nighttime far vision area 38 extending around the night vision reference point 31. The nighttime far vision area 38 has a uniform spherical power. In this example, the nighttime far vision area 38 presents a nighttime spherical power addition of −0.5 diopter relatively to the second fitting point 18. In this example, the shape of the nighttime far vision area 38 in the (XZ) plane is a disk presenting a linear top cut. The nighttime far vision area 38 has a width of about 25 mm+/−5 mm and a height of about 18 mm +/− 2 mm. The daytime far vision area 21 has a disk-shape or an elliptic shape. For example, the daytime far vision area 21 has a disk-shape, of 5 mm to 10 mm in diameter. The daytime near vision area 24 has a disk-shape or an elliptic shape. For example, the daytime near vision area 24 has a disk-shape, of 5 mm to 10 mm in diameter.

During manufacturing of a lens 4 according to the third embodiment, illustrated on FIG. 7, the spherical power distribution corresponding to the dotted lines of FIG. 8 is applied to the concave face 7 of the lens 4 and, respectively, the spherical power distribution corresponding to the dashed lines of FIG. 8 is applied to the upper part of the convex face 6 of the lens 4.

FIG. 9 schematically shows an example of distribution of unwanted astigmatism in projection in the (XZ) plane for a progressive addition lens having a spherical power distribution as illustrated on FIG. 8. In FIG. 9, the dotted lines represent iso-astigmatism residual power lines for the first optical spherical power variations corresponding to the day light far vision area and near vision area. In this example, it is observed no residual astigmatism induced by the nighttime far vision area 38 of −0.5 diopter formed on the convex face 6 of the lens.

FIG. 10 illustrates a fourth embodiment of the lens 4 wherein the first optical spherical power variation for daytime vision is formed on the convex face 6 of the lens and the second optical spherical power variation for nighttime vision is formed on the concave face 7 of the lens. Similarly as in FIG. 4C, the second optical spherical power variation presents continuous variations between the second fitting point 18 to the night vision reference point 31 on the concave face 7 of the lens 4. However, in contrast with the embodiment shown on FIG. 4C, in this fourth embodiment, the first optical spherical power variation presents a discontinuity on the convex face 6 along the meridian curve 16 joining the first fitting point 11 to the near vision reference point 14.

FIG. 11 shows an example of spherical power variations for a lens according to the third embodiment illustrated on FIG. 10. The lens 4 has a 0.00 spherical power at the first fitting point and a +2.0 spherical power addition at the near vision reference point 14 for daytime vision conditions. The dotted lines represents the contours of the daytime near vision area 24 extending around the near vision reference point 14 with a uniform +2.0 spherical power addition. The dashed lines show the variations of second optical spherical power from the second fitting point 18 to the night vision reference point 31. In the plane of FIG. 11, the first fitting point 11 and the second fitting point 18 are superimposed. The daytime near vision area 24 has a uniform spherical power. In this example, the daytime near vision area 24 presents a spherical power addition of +2.0 diopter relatively to the first fitting point for daytime vision. In this example, the shape of the daytime near vision area 24 in the (XZ) plane is a cut disk as used in bifocal lenses. The width of the near vision area 24 is about 25 mm +/− 5 mm and the height of the near vision area 24 is about 18 mm +/− 2 mm. The daytime far vision area 21 has a disk-shape or an elliptic shape. For example, the daytime far vision area 21 has a disk-shape, of 5 mm to 10 mm in diameter. The nighttime far vision area 38 has a disk-shape or an elliptic shape. For example, the nighttime far vision area 38 has a disk-shape, of 5 mm to 10 mm in diameter.

During manufacturing of a lens 4 according to the fourth embodiment, illustrated on FIG. 10, the spherical power distribution corresponding to the dotted lines of FIG. 11 is applied to the lower part of the convex face 6 of the lens 4 and, respectively, the spherical power distribution corresponding to the dashed lines of FIG. 11 is applied to the upper part of the concave face 7 of the lens 4.

FIG. 12 schematically shows an example of distribution of unwanted astigmatism in projection in the (XZ) plane for a progressive addition lens having a spherical power distribution as illustrated on FIG. 11. In FIG. 12, the dotted lines represent iso-astigmatism residual power lines for the second optical spherical power variations corresponding to the night light far vision area and day light far vision area. In this example, it is observed no residual astigmatism induced by the daytime near vision area 24 of +2.0 diopter formed on the convex face 6 of the lens.

Method

A progressive addition lens according to the present disclosure is manufactured by applying the following steps.

The prescription of the user is determined in far vision and near vision in conventional day time illumination conditions.

In particular, the near vision power addition of the near vision reference point is determined relatively to the first fitting point for each eye. The inset E of the near vision reference point is also determined for each eye. Other parameters such as for example interpupillary distance are also determined for each eye relatively to the sagittal plane of the user.

Furthermore, the far vision night myopia of the user is determined in nighttime illumination conditions. Generally, night myopia is comprised between 0.25 diopter and 1 diopter. The nighttime spherical power variation is determined so as to compensate for night myopia in far vision.

Alternatively, a nighttime or second spherical power variation is selected among preset values for example: −0.25, −0.50, −0.75 and −1.00 diopter.

A range for head declination angle BETA, and for opposite eye direction declination angle ALPHA is determined so as to enable comfortable vision in night time for the user. Alternatively, the value of ALPHA and BETA is selected between 10 degrees and 25 degrees, and preferably equal to 15 degrees.

Depending on the frame, the range available for the first progression length, LOC1, between the first fitting point 11 and the near vision reference point 14 is determined. Similarly, depending on the frame and on the range for the first progression length LOC1, the range available for the second progression length, LOC2, between the second fitting point 18 and the night vision reference point 31 is determined.

Optionally, the size ranges of the daytime far vision area 21, of the near vision area 24 and/or respectively of the nighttime far vision area 38 are selected as input parameters.

An optimization model is applied, taking into account the prescription parameters, the nighttime or second spherical power variation, the frame dimensions, optionally the pupillary distance, horizontal and vertical lens fitting positions in the frame, the head declination angle BETA for night vision, the ranges for LOC1 and LOC2, the size of one or several vision area, the pantoscopic angle of frame, the tilt of frame, the distance of eye rotation center to back vertex of lens. The optimization is performed while minimizing unwanted astigmatism at the near vision reference point, at the first fitting point, at the night vision reference point 31 and optionally in the corresponding vision areas.

Preferably, at least one of the first optical spherical power variation and the second optical spherical power variation is continuous. The choice of a continuous or discontinuous optical spherical power variation for the first optical spherical power variation between the first fitting point and the near vision reference point may be an option. Similarly, the choice of a continuous or discontinuous optical spherical power variation for the second optical spherical power variation between the second fitting point to the night vision reference point may be another option.

As an option, the optimization is conducted so that a plane including the first fitting point 11, the second fitting point 18 and the night vision reference point 31 is tangent to the meridian curve 16 at the first fitting point 11.

Those skilled in the art will recognize that other constraints may be applied during the optimization process depending on specific needs of the user.

As a result, the position of the first fitting point 11, the near vision reference point 14, the second fitting point 18 and the night vision reference point 31 are determined in projection in the mounting plane (X, Z) of the lens. Also, the path of the meridian curve 16 is determined. Similarly the path of the progressive line 35 is determined. More generally, the spatial distribution of the spherical power on one surface or, respectively, on both surfaces of the lens is determined as illustrated for example in FIGS. 5, 8 and 11. The corresponding residual or unwanted astigmatism curves are also evaluated as illustrated in FIGS. 6, 9 and 12.

In the case of the first embodiment (FIG. 4A), the spherical power distribution is shaped or machined only on the concave face 7 of the lens 4.

In the other embodiments, a part of the optical spherical power distribution corresponding to daytime vision from far vision to near vision is shaped or machined on one face of the lens and the other part of the optical spherical power distribution corresponding to far vision from daytime to nighttime is shaped or machined on the other face of the lens.

Optionally, the optical power distribution of the lens further includes an additional cylindrical power defined by a cylinder value and cylinder axis. This additional cylindrical power is formed uniformly across the whole surface of the lens.

The invention claimed is:

1. A progressive addition lens comprising:
   a first fitting point and a near vision reference point located on a same face of the lens, the first fitting point having an optical spherical power suitable for far vision in day light conditions, the first fitting point being positioned on a straight horizontal eye gaze direction when a user wears the progressive addition lens mounted in a frame with a null user head declination angle, the near vision reference point being positioned on a downward eye gaze direction when the user wears the progressive addition lens mounted in the frame with the null user head declination angle, the progressive addition lens comprising a first optical spherical power variation between the first fitting point and the near vision reference point; and
   a second fitting point and a night vision reference point located on another face of the lens, the second fitting point being positioned on a straight horizontal eye gaze direction when the user wears the progressive addition lens mounted in the frame with a null user head declination angle and that the position of the frame, lens, and temple remains fixed relatively to the user's face, the night vision reference point having an optical spherical power suitable for far vision in night time conditions, the night vision reference point being positioned on an eye gaze direction inclined by an upward eye gaze declination angle when the user wears the progressive addition lens mounted in the frame with a downward head declination angle equal in degrees and opposite in sign to the upward eye gaze declination angle without moving the frame relatively to the user's face, the progressive addition lens comprising a second optical spherical power variation between the second fitting point and the night vision reference point, an optical spherical power at the night vision reference point being lower than an optical spherical power at the second fitting point, and the first optical spherical power variation between the first fitting point and the near vision reference point being formed on a face of the progressive addition lens and the second optical spherical power variation is formed on another face of the progressive addition lens.

2. The progressive addition lens according to claim 1, wherein spherical power at the night vision reference point is lower than spherical power at the second fitting point by a value comprised between −0.25 diopter and −1.00 diopter.

3. The progressive addition lens according to claim 1, wherein the night vision reference point is positioned on an eye gaze direction having an upward eye gaze declination angle comprised between 10 degrees and 25 degrees.

4. The progressive addition lens according to claim 1, wherein the night vision reference point is at a distance of 12 mm±7 mm from the second fitting point and wherein the night vision reference point presents a null inset relatively to the second fitting point.

5. The progressive addition lens according to claim 1, further comprising a night vision area extending around the night vision reference point, the night vision area being enclosed in a cone having its apex located at an eye rotation center of the user eye located behind the progressive lens, the night vision area having a uniform nighttime spherical power addition.

6. The progressive addition lens according to claim 5, further comprising a daytime far vision area extending around the first fitting point, the daytime far vision area having a uniform spherical power and wherein the night vision area and the daytime far vision area are connected by a corridor having a length and/or width adjusted as a function of the user.

7. The progressive addition lens according to claim 6, wherein the daytime far vision area extends over a surface greater than a disk of at least a few millimeters in diameter.

8. The progressive addition lens according to claim 5, wherein the night vision area extends over a surface greater than a disk of at least a few millimeters in diameter.

9. The progressive addition lens according to claim 1, wherein at least one of the first optical spherical power variation and the second optical spherical power variation is continuous and:
   the first optical spherical power variation presents a continuous optical spherical power variation from the first fitting point to the near vision reference point; or
   the first optical spherical power variation presents discontinuous optical spherical power variation between the first fitting point and the near vision reference point while the second optical spherical power variation presents continuous optical spherical power variation from the second fitting point to the night vision reference point; or
   the second optical spherical power variation presents a continuous optical spherical power variation from the second fitting point to the night vision reference point; or
   the second optical spherical power variation presents discontinuous optical spherical power variation between the second fitting point and the night vision reference point while the first optical spherical power variation presents continuous optical spherical power variation from the first fitting point to the near vision reference point.

10. The progressive addition lens according to claim 1, further comprising a cylindrical power.

11. A method for manufacturing a progressive addition lens comprising:
   determining a first fitting point and a near vision reference point located on a same face of a lens, the first fitting point being positioned on a straight horizontal eye gaze direction when a user wears the progressive addition lens mounted in a frame with a null user head declination angle, the near vision reference point being positioned on a downward inclined eye gaze direction when the user wears the progressive addition lens mounted in the frame with the null user head declination angle, determining a daytime far vision spherical power for the first fitting point, and determining a first optical spherical power variation between the first fitting point and the near vision reference point;

determining a downward head declination angle equal in degrees and opposite in sign to an upward eye gaze declination angle for far vision in nighttime;

determining a second fitting point and a night vision reference point located on a same face of the lens, the second fitting point being positioned on a straight horizontal eye gaze direction when the user wears the progressive addition lens mounted in the frame with a null user head declination angle and the night vision reference point being determined based on the determined downward head declination angle and the upward eye gaze declination angle when the user wears the progressive addition lens mounted in the frame with the downward head declination angle opposite to the upward eye gaze declination angle without moving the frame relatively to the user's face; and determining a second optical spherical power variation between the second fitting point and the night vision reference point, an optical spherical power at the night vision reference point being lower than an optical spherical power at the second fitting point.

12. The method for manufacturing a progressive addition lens according to claim 11, wherein spherical power at the night vision reference point is lower than spherical power at the second fitting point by a value comprised between −0.25 diopter and −1.00 diopter.

13. The method for manufacturing a progressive addition lens according to claim 12, wherein the first optical spherical power variation and the second optical spherical power variation are both formed on a concave face of the progressive addition lens.

14. The method for manufacturing a progressive addition lens according to claim 12, further comprising forming the first optical spherical power variation between the first fitting point and the near vision reference point on a face of the progressive addition lens and foaming the second optical spherical power variation between the second fitting point and the night vision reference point on another face of the progressive addition lens.

15. The method for manufacturing a progressive addition lens according to claim 12, wherein the night vision reference point is located at a distance of 12 mm±7 mm from the second fitting point and wherein the night vision reference point presents a null inset relatively to the second fitting point.

* * * * *